(12) United States Patent
Seman, Sr. et al.

(10) Patent No.: US 9,096,002 B2
(45) Date of Patent: Aug. 4, 2015

(54) METHOD OF MAKING AN OVERMOLDED WATERWAY CONNECTION

(75) Inventors: Richard F. Seman, Sr., Middlefield, OH (US); Earl Christian, Jr., Warren, OH (US); William Blue, Middlefield, OH (US); Scott R. Gardner, Middlefield, OH (US); William Shane Hochstetler, Middlefield, OH (US)

(73) Assignee: Mercury Plastics, Inc., Middlefield, OH (US)

( * ) Notice: Subject to any disclaimer, the term of this patent is extended or adjusted under 35 U.S.C. 154(b) by 698 days.

(21) Appl. No.: 13/312,524

(22) Filed: Dec. 6, 2011

(65) Prior Publication Data

US 2013/0075952 A1 Mar. 28, 2013

Related U.S. Application Data

(63) Continuation-in-part of application No. 13/088,992, filed on Apr. 18, 2011, now Pat. No. 8,337,738, which is a continuation of application No. 12/618,332, filed on Nov. 13, 2009, now Pat. No. 7,927,534.

(51) Int. Cl.
*B29C 45/14* (2006.01)
*E03C 1/02* (2006.01)
*B29C 33/00* (2006.01)

(52) U.S. Cl.
CPC ........... *B29C 45/14614* (2013.01); *E03C 1/021* (2013.01); *B29C 33/0016* (2013.01); *B29C 45/14377* (2013.01)

(58) Field of Classification Search
None
See application file for complete search history.

(56) References Cited

U.S. PATENT DOCUMENTS

| | | | |
|---|---|---|---|
| 300,005 A * | 6/1884 | Patterson | 285/289.1 |
| 2,200,091 A | 5/1940 | Kovach | |
| 3,520,325 A | 7/1970 | Stuart | |
| 3,998,240 A | 12/1976 | Liautaud | |
| 4,312,687 A * | 1/1982 | Sigworth, Jr. | 156/245 |
| 4,641,860 A * | 2/1987 | McMickle et al. | 285/38 |
| 4,997,213 A * | 3/1991 | Traner et al. | 285/131.1 |
| 5,092,632 A * | 3/1992 | Washizu et al. | 285/62 |
| 5,299,839 A * | 4/1994 | Mogavero | 285/110 |
| 5,302,336 A * | 4/1994 | Hartel et al. | 264/263 |
| 5,356,587 A * | 10/1994 | Mitsui et al. | 264/263 |
| 5,447,341 A | 9/1995 | Hartel et al. | |

(Continued)

OTHER PUBLICATIONS

U.S. Appl. No. 12/618,158, filed Nov. 13, 2009.

(Continued)

*Primary Examiner* — Edmund Lee
(74) *Attorney, Agent, or Firm* — Hahn Loeser & Parks, LLP

(57) ABSTRACT

A process for providing an overmolded waterway comprising inserting a shaft portion of a sacrificial core into an end of a tube, the shaft portion having a first opening therein, the sacrificial core having a second portion comprising a second opening and a contact surface about the second opening, the second opening in fluid communication with the first opening and the inside of the tube, in a mold cavity inserting a core pin transverse to the tube end, the sacrificial core contact surface engaging a mating surface of the core pin closing the second opening, injection overmolding over a portion of the tube end and core pin forming an overmolded waterway having an outlet portion in fluid communication with the second opening and the inside of the tube, and removing the core pin from the second opening through the outlet portion and removing the overmolded waterway from the mold cavity.

11 Claims, 6 Drawing Sheets

(56) References Cited

U.S. PATENT DOCUMENTS

| | | |
|---|---|---|
| 5,895,695 A | 4/1999 | Rowley |
| 5,965,077 A | 10/1999 | Rowley |
| 6,082,780 A * | 7/2000 | Rowley et al. ............. 285/132.1 |
| 6,116,884 A | 9/2000 | Rowley |
| 6,287,501 B1 | 9/2001 | Rowley |
| 6,432,345 B1 | 8/2002 | Warburton-Pitt |
| 6,635,214 B2 | 10/2003 | Rapacki et al. |
| 7,398,954 B2 | 7/2008 | Herren et al. |
| 7,406,980 B2 | 8/2008 | Pinette |
| 7,766,043 B2 | 8/2010 | Thomas et al. |
| 7,927,534 B1 | 4/2011 | Seman, Sr. et al. |
| 2007/0271695 A1 | 11/2007 | Thomas et al. |
| 2010/0313979 A1 | 12/2010 | Thomas et al. |
| 2011/0259456 A1 | 10/2011 | Pinette et al. |

OTHER PUBLICATIONS

U.S. Appl. No. 12/618,226, filed Nov. 13, 2009.
U.S. Appl. No. 12/618,089, filed Nov. 13, 2009.
U.S. Appl. No. 12/618,296, filed Nov. 13, 2009.

* cited by examiner

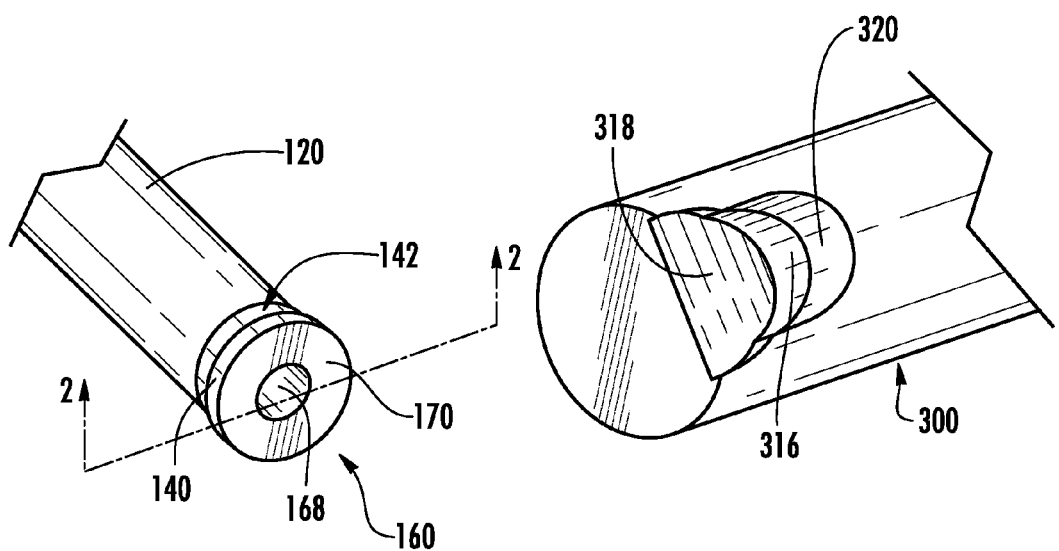

METHOD OF MAKING AN OVERMOLDED WATERWAY CONNECTION

This application claims priority to U.S. patent application Ser. No. 13/088,992, filed Apr. 18, 2011, now U.S. Pat. No. 8,337,738, which claims priority to U.S. patent application Ser. No. 12/618,332, filed Nov. 13, 2009, now U.S. Pat. No. 7,927,534, both of which are incorporated herein by reference.

BACKGROUND

For certain appliance applications, it is desired to connect a waterway tube to a second part, where the second part may be a water source, a water dispensing apparatus, a filtering apparatus, another tube, or other part or assembly. In the past, such connections were often press-fit into the end of the tube. For certain prior applications, connections were overmolded onto the tube using injection molding. Prior overmolded connections extended longitudinally from the end of the tube, such as disclosed by example in U.S. patent application Ser. No. 10/904,694, filed Nov. 23, 2004; included elastomeric materials, such as U.S. Pat. No. 6,082,780, issued Jul. 4, 2000; and were overmolded in a curved section such as disclosed in U.S. patent application Ser. No. 12/618,158, filed Nov. 13, 2009. In prior overmolded tube ends, the shape of the overmold provided at least a portion of a core pin or mandrel of an injection mold extending into the end of the tube during overmolding, after which the core pin or mandrel was extracted through the end of the overmolded part after molding. This requirement limited the shape and orientation of the overmolded part to accommodate core pin removal, or required a flexible overmolded material capable of stretching for removal from the core of the injection mold.

Traditional overmolding of a tube requires the tube be placed onto a core pin within the mold. The core pin in the end of the tube provides support to the inside of the tube so that it can be clamped without damaging the tube. The core pin in the tube end also prevents plastic from entering the inside of the tube. Waterways in which the axis of the tube and the axis of the core are co-linear are known formed by inserting a mold core pin into the end of the tube as discussed above. However, there are physical limitations to overmolding onto a tube in a tight radius or angle. The Prior Art teaches that in order to create a typical 90° elbow, acute angle, or obtuse angle overmold, the sweep must be of a radius large enough to allow the core pin in the tube to create an arc that permits the core pin to be retracted. This limits the application of Prior Art to flexible or elastomeric plastics. There remains a need for a process for making an overmolded waterway for rigid and semi-rigid connections extending at an angle from the longitudinal direction of the tube.

SUMMARY OF THE DISCLOSURE

What is disclosed is a process for providing an overmolded waterway comprising:
providing a tube of a first polymeric material having a tube inside dimension at a proximate end,
inserting a shaft portion of a sacrificial core into said end of the tube, the shaft portion having a first opening therein, the sacrificial core having a second portion adjacent the end of the tube comprising a second opening and a contact surface about the second opening, the second opening in fluid communication with the first opening and the inside of the tube,
positioning at least the end of the tube with the sacrificial core into a mold cavity having a desired shape,
positioning a core pin at least partially into the mold cavity transverse to the tube end, the sacrificial core contact surface engaging a mating surface of the core pin closing the second opening,
injection overmolding a second polymeric material into the mold cavity over a portion of the tube end and core pin forming a waterway, the overmolded waterway having an outlet portion in fluid communication with the second opening and the inside of the tube,
an interface of the sacrificial core contact surface and the mating surface of the core pin inhibiting ingress of molten polymer into the second opening, and
removing the core pin from the second opening through the outlet portion and removing the overmolded waterway from the mold cavity.

In one alternative, the sacrificial core second portion includes an extending lip, and the process further comprises forming a groove between the extending lip and the tube end, and where the step of inserting a core pin includes geometry on the core pin engaging the groove releasably engaging the sacrificial core contact surface against the mating surface of the core pin closing the second opening.

In another alternative, the sacrificial core contact surface forms a bore, and the step of inserting a core pin includes inserting geometry on the core pin corresponding to the contact surface into the bore releasably engaging the sacrificial core contact surface against the mating surface of the core pin closing the second opening.

The overmolded waterway may be crosslinked, and the process further include providing a fitting having a first fitting portion and a second fitting portion and a bore there through, the first fitting portion having an outermost dimension equal to or larger than a corresponding cross-sectional dimension of the outlet portion, and inserting the first fitting portion into the outlet portion enlarging the outlet portion.

Also disclosed is a process for providing an overmolded waterway comprising
providing a longitudinal tube having a tube inside dimension at a proximate end,
inserting a shaft portion of a sacrificial core into said end of the tube, the shaft portion having a first opening therein, the sacrificial core having a second portion adjacent the end of the tube comprising a second opening, the second opening in fluid communication with the first opening and the inside of the tube,
positioning at least the end of the tube with the sacrificial core into a mold cavity having a desired shape,
positioning a core pin at least partially into the mold cavity with a portion of the core pin into the sacrificial core second opening closing the second opening,
injection overmolding a waterway over a portion of the tube end and core pin in the mold cavity, the overmolded waterway having an outlet portion in fluid communication with the second opening and the inside of the tube, and
removing the core pin from the second opening through the outlet portion and removing the overmolded waterway from the mold cavity.

The overmolded waterway may be crosslinked, and the process further include providing a fitting having a first fitting portion and a second fitting portion and a bore there through, the first fitting portion having an outermost dimension equal to or larger than a corresponding cross-sectional dimension of the outlet portion, and inserting the first fitting portion into the outlet portion enlarging the outlet portion.

BRIEF DESCRIPTION OF THE DRAWINGS

FIG. 4 is a perspective view illustrating the sacrificial core inserted into the tube, FIG. 5 is a perspective view illustrating a core pin with associated cavity disposed therein.

DETAILED DESCRIPTION OF THE DRAWINGS

The best mode for carrying out the invention will now be described for the purposes of illustrating the best mode known to the applicant at the time. The examples are illustrative only and not meant to limit the invention, as measured by the scope and spirit of the claims. The embodiments selected for description have been chosen to enable one skilled in the art to practice the invention. Although the disclosure is described in connection with water, it should be understood that other types of fluids (including gases) may be used.

Figure 3:
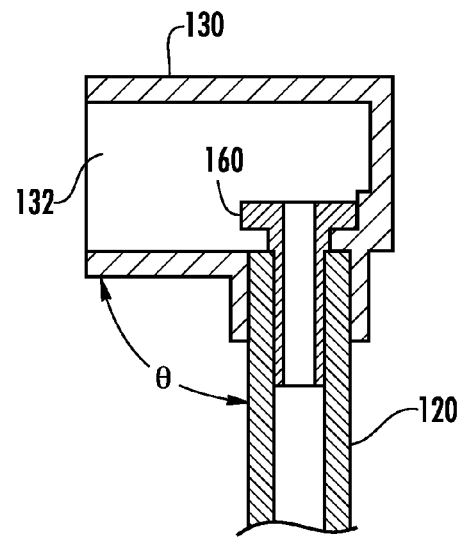
FIG. 3 is a cross-sectional view of the overmolded waterway of FIG. 1 with the sacrificial core of FIG. 2.
Figure 1:
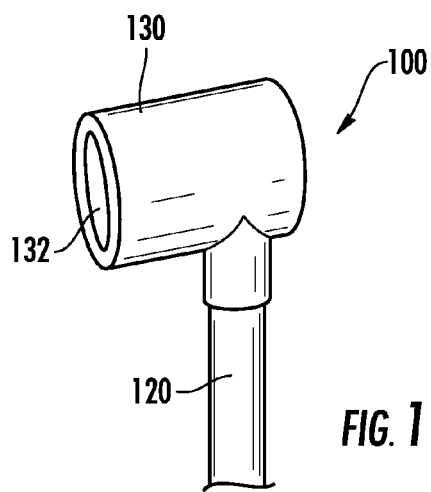
FIG. 1 is a perspective view of an overmolded waterway of the present disclosure.

As shown in FIG. 1, an overmolded waterway component 100 includes a waterway tube 120 and an overmolded waterway 130 having an outlet portion 132. The outlet portion 132 may be oriented at a desired angle from the longitudinal direction of the tube, shown by angle θ in FIG. 3. Angle θ may be approximately 90° as shown in FIG. 3. Alternatively, angle θ may be between about 15° and 175° from the longitudinal direction of the tube. In other alternatives, such as examples shown in FIGS. 8 and 9, the angle θ may be between about 15° and 90°, and alternatively may be between about 30° and 70°. In yet another alternative, such as an example shown in FIG. 14, the angle θ' may be between about 90° and 175°, and alternatively may be between about 120° and 160°.

Figure 2:
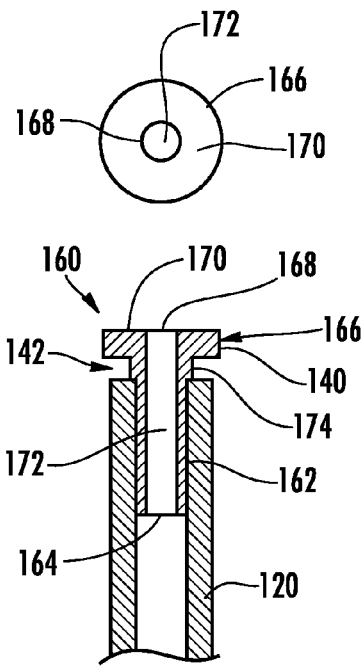
FIG. 2 is a cross-sectional view of a sacrificial core inserted into a tube of FIG. 4 and an end view of one example of the sacrificial core.

Referring now to FIGS. 2 and 3, a sacrificial insert, or sacrificial core, is employed. As used in this application, the term "sacrificial" means that the insert or core becomes a permanent component of the finished product. The sacrificial core contains a throughway in which a fluid may pass. The sacrificial core is placed into the tube, with the sacrificial core and tube combination positioned into a mold cavity having a core pin having desired geometry for molding the overmolded waterway. In one alternative, the core pin in the mold includes an insert cavity within the core pin itself (the "insert cavity"). A portion of the sacrificial core is positioned in the insert cavity to protect the opening of the sacrificial core from the molten plastic during the overmolding process. When the finished part is removed from the core pin, the sacrificial core slides out of the insert cavity within the core pin and becomes a permanent component of the finished part.

More specifically, as shown in FIG. 2, the sacrificial core 160 has a shaft portion 162 insertable into an end of the waterway tube 120, the shaft portion 162 of the sacrificial core having a first opening 164 therein. As shown in FIG. 2, the sacrificial core 160 has a second portion 166 positionable adjacent the end of the tube comprising a second opening 168 and a contact surface 170 about the second opening, the second opening 168 in fluid communication with the first opening 164 by a throughway 172 in which a fluid may pass.

The shaft portion 162 of the sacrificial core 160 has a cross-sectional shape corresponding to the inside of the waterway tube 120. In one alternative, the tube 120 is a cylindrical tube and the cross-sectional shape of the shaft portion 162 is a corresponding cylindrical shape. However, the waterway tube 120 need not be circular, but rather can have non-circular shapes and combinations thereof. In other alternatives not shown, the cross-sectional shape of the tube 120 and corresponding shaft portion 162 may be oval, D-shape, rectangular, square, or any other cross-sectional shape as desired. The outside dimensions of the shaft portion 162 are similiarly sized to the inside dimensions of the waterway tube 120. In one example, the outside dimensions of the shaft portion 162 are slightly smaller than the inside dimensions of the waterway tube 120 to facilitate insertion into the tube. It is recognized that depending on the elasticity of the tube 120, it is possible that the outside dimensions of the shaft portion 162 can even be slightly larger than the inside dimensions of the tube 120. The shaft portion 162 may be inserted into the end of the tube 120 as shown in FIGS. 2-4 such that the second opening 168 is in fluid communication with the inside of the tube 120 by the throughway 172.

Figure 7:
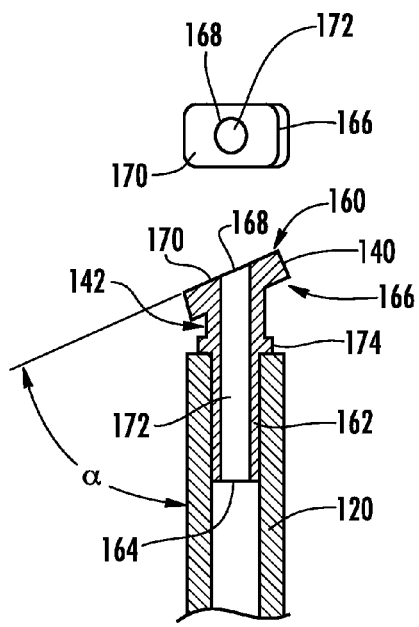
FIG. 7 is a cross-sectional view of an alternative sacrificial core inserted into a tube and an end view of one example of the sacrificial core.
Figure 8:
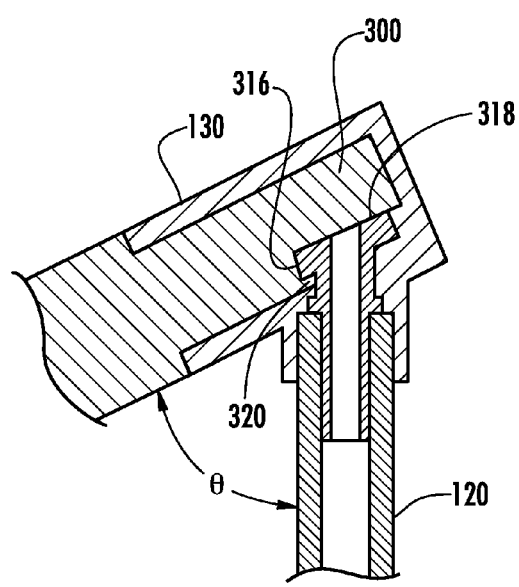
FIG. 8 is a cross-sectional view of the overmolded waterway of FIG. 6A or FIG. 6B with the sacrificial core of FIG. 7 and showing the mold core pin engaging the sacrificial core following overmolding.

In order to inhibit molten plastic flow into the sacrificial core 160 during molding, a core pin 300 such as shown in FIG. 5 may be provided corresponding to the second portion 166 of the sacrificial core 160 to close the second opening 168. In one alternative, such as shown in FIG. 2, the second portion 166 may include an extending lip 140, such that when the shaft portion 162 is inserted in the tube 120, the extending lip 140 forms a groove 142 between the extending lip 140 and the tube end. As shown in FIG. 5, the core pin 300 may include a cavity 316 corresponding to the extending lip 140 and groove 142. In the embodiment shown in FIG. 5, the cavity 316 includes a shut-off surface 318 corresponding to the second portion contact surface 170 such that a flange portion 320 of the core pin engages the groove 142 releasably engaging the sacrificial core contact surface 170 against the mating surface 318 of the core pin closing the second opening 168. When the extending lip 140 is positioned within the cavity 316, the sacrificial core contact surface 170 engages the mating shut-off surface 318 of the core pin closing the second opening 168 such as shown in FIG. 8. Depending on the exterior configuration of core pin 300, the contact surface 170 and mating shut-off surface 318 need not be flat, but rather can be arcuate in nature. In one aspect of the invention (not shown), the top portion of the extending lip 140 forming the contact surface 170 is arcuate in a concave manner. Alternatively, the contact surface 170 may be angled such as shown in FIGS. 7 and 8. As shown in the end view of FIG. 2, the extending lip 140 may have a circular shape. Alternatively, the extending lip 140 may have a rectangular shape such as shown in the end view of FIG. 7. In other alternatives, the extending lip 140 may have any shape as desired for engaging a corresponding core pin cavity 316.

As shown in FIG. 2, the sacrificial core 160 may optionally include a protrusion 174 or other geometry positioned to inhibit over-insertion of the sacrificial core 160 into the tube. The protrusion 174 may be an embossment or other feature having an outside dimension larger than the inside dimension of the tube. The protrusion 174 may be positioned forming the groove 142 such that by insertion of the core 160 into the tube 120 until a surface of the protrusion 174 is adjacent the tube end, the placement forms the desired groove 142. As used herein, the term inside dimension means a cross-sectional dimension defining a desired portion of the inside of the tube, waterway, fitting, or other component or portion having an internal construction. For example, the inside dimension for a cylindrical tube is commonly the inside diameter of the tube. Other inside dimensions will be apparent to those skilled in the art, such as the height or width dimension between opposing sides of a cross section, or other defining dimensions as desired for the cross-sectional shape. Similiarly, the outside dimension is used to mean a cross-sectional dimension defining a desired portion of the outside perimeter of a component.

In one example shown in FIG. 4, the tube 120 is an extruded tube into which is inserted the sacrificial core 160, the sacrificial core having a circumferentially extending lip 140 and forming a groove 142 for insertion into the cavity 316 of the core pin 300.

Figure 6A:
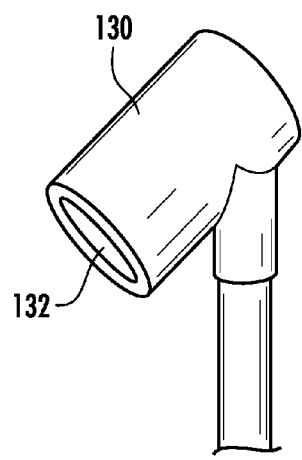
FIGS. 6A and 6B are perspective views of alternative overmolded waterways of the present disclosure.
Figure 6B:
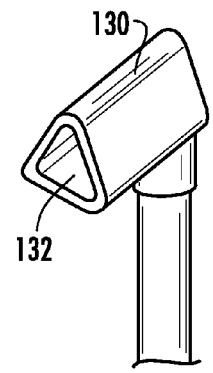

The overmolded waterway 130 such as shown in FIG. 1 may be formed by injection molding the waterway 130 onto the tube 120 and sacrificial core 160. In the overmolding process, the end portion of tube 120 with the sacrificial core 160, such as shown in FIG. 4, are positioned in a mold cavity (not shown) having a desired shape corresponding to the desired overmolded waterway. The core pin 300 is positioned in the mold cavity transverse to the tube end, the sacrificial core contact surface 170 engaging the mating surface 318 of the core pin closing the second opening 168. The core pin 300 corresponds to the desired geometry of the inside dimensions of the overmolded waterway 130. As shown in FIGS. 1 and 6A, the overmolded waterway 130 and corresponding core pin 300 may have a circular cross-section. However, the overmolded waterway 130 need not be circular, but rather can have non-circular shapes and combinations thereof, such as shown by one example in FIG. 6B. In other alternatives not shown, the cross-sectional shape of the overmolded waterway and corresponding core pin may be oval, D-shaped, rectangular, square, or any other cross-sectional shape as desired.

In the example of FIGS. 4 and 5, prior to overmolding, the tube end and core pin 300 are positioned in the injection mold cavity such that the sacrificial core extending lip 140 and groove 142 engages the cavity 316 to close the second opening 168. In the overmolding process, a polymeric material is injected into the mold cavity over a portion of the tube end and core pin forming the overmolded waterway 130, an interface of the sacrificial core contact surface 170 and the mating surface 318 of the core pin inhibiting ingress of molten polymer into the second opening 168. The overmolded waterway has the outlet portion 132 in fluid communication with the second opening 168 and the inside of the tube 120. Typically, the step of injection overmolding forms a bond between an exterior surface of the tube and an interior surface of the overmolded waterway. After molding the waterway 130, the core pin 300 is removed from the second opening 168 through the outlet portion 132.

In an alternative such as shown in FIGS. 6-8, the overmolded waterway 130 includes like-numbered features described with respect to FIGS. 1-3, further including an angled waterway such that the angle θ (shown in FIG. 8) may be between about 15° and 90°. Alternatively, the angle θ may be between about 30° and 70°. In yet another alternative, the angle θ may be between about 90° and 175°, and alternatively may be between about 120° and 160°. In an angled waterway connection shown in FIG. 8, the sacrificial core second portion 166 is angled to facilitate engagement with the cavity 316 on the core pin 300 such as shown in FIGS. 7-8. Typically, the angle between the second portion 166 and the shaft portion, shown as angle α in FIG. 7, is approximately the same as angle θ. It is contemplated that for certain applications it may be desired that angle α be less than angle θ, such as to provide a draft angle to aid in removal of the core pin after molding. Alternatively, the angle α may be greater than angle θ.

As shown in the end view of FIG. 7, the extending lip 140 may have a rectangular shape for orientation of the sacrificial core 160 in the core pin cavity 316. In other alternatives, the extending lip 140 may be circular such as shown in the end view of FIG. 2, or may have any shape as desired for engaging the corresponding core pin cavity 316.

Figure 9:
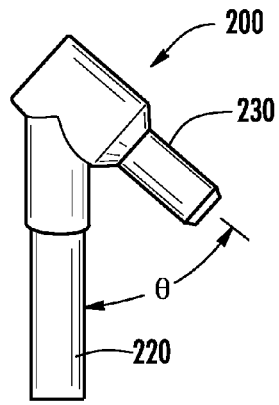
FIG. 9 is a side view of a male half of an overmolded waterway connection for an acute angle connection.
Figure 10:
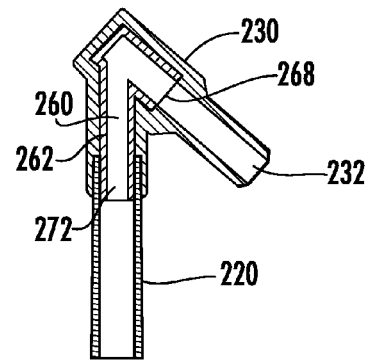
FIG. 10 is a cross-sectional view through the overmolded waterway connection of FIG. 9.

In an alternative embodiment shown in FIGS. 9 and 10, an overmolded waterway component 200 includes a waterway tube 220 and an overmolded waterway 230 having an outlet portion 232. The outlet portion 232 may be oriented at a desired angle from the longitudinal direction of the tube, shown by angle θ in FIG. 9. Angle θ may be approximately 45° as shown in FIG. 9. Alternatively, angle θ may be between about 15° and 175° from the longitudinal direction of the tube. In other alternatives, such as the example shown in FIG. 9, the angle θ may be between about 15° and 90° from the longitudinal direction of the tube, and alternatively may be between about 30° and 70°. In the alternative shown in FIG. 14, the angle θ may be between about 90° and 175° from the longitudinal direction of the tube, and alternatively may be between about 120° and 160°.

Figure 11:
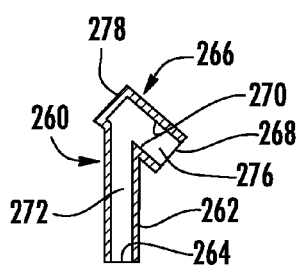
FIG. 11 is a cross-sectional view through a sacrificial core for an acute angle overmolded waterway.

More specifically, as shown in FIGS. 10 and 11, the sacrificial core 260 has a shaft portion 262 insertable into an end of the waterway tube 220, the shaft portion 262 of the sacrificial core having a first opening 264 therein. As shown in FIG. 11, the sacrificial core 260 has a second portion 266 positionable adjacent the end of the tube comprising a second opening 268 and a contact surface 270 about the second opening, the second opening 268 in fluid communication with the first opening 264 by a throughway 272 in which a fluid may pass.

The shaft portion 262 of the sacrificial core 260 has a cross-sectional shape corresponding to the inside of the tube 220. In one alternative, the tube 220 is a cylindrical tube and the cross-sectional shape of the shaft portion 262 is a corresponding cylindrical shape. However, the waterway tube 220 need not be circular, but rather can have non-circular shapes and combinations thereof. In other alternatives not shown, the cross-sectional shape of the tube 220 and corresponding shaft portion 262 may be oval, D-shape, rectangular, square, or any other cross-sectional shape as desired. The outside dimensions of the shaft portion 262 are similiarly sized to the inside dimensions of the tube 220. In one example, the outside dimensions of the shaft portion 262 are slightly smaller than the inside dimensions of the waterway tube 220 to facilitate insertion into the tube. It is recognized that depending on the elasticity of the tube 220, it is possible that the outside dimensions of the shaft portion 262 can even be slightly larger than the inside dimensions of the tube 220. The shaft portion 262 may be inserted into the end of the tube 220 as shown in FIG. 10 such that the second opening 268 is in fluid communication with the inside of the tube 220 by the throughway 272.

Figure 15:
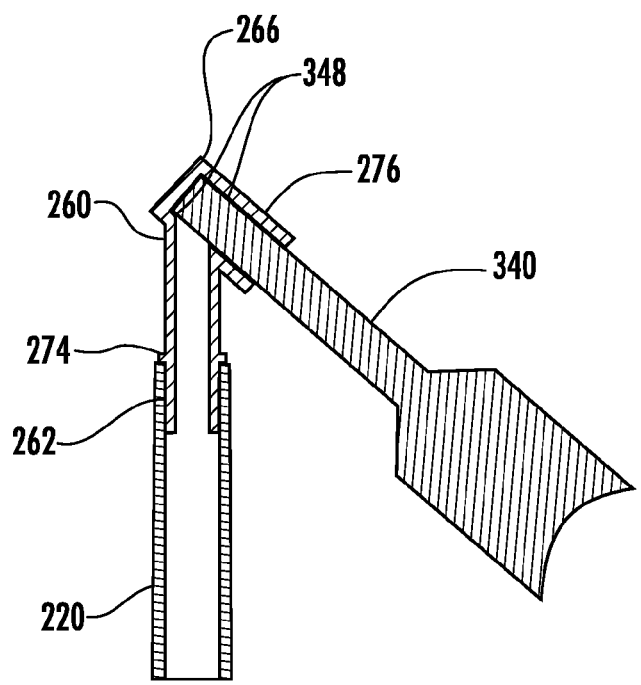
FIG. 15 is a cross-sectional view of the sacrificial core of FIG. 11 prior to overmolding showing a mold core pin inserted into the sacrificial core in preparation for molding.

In order to inhibit molten plastic flow into the sacrificial core 260 during molding, a core pin 340 may be provided corresponding to the second portion 266 of the sacrificial core 260 to close the second opening 268. In one alternative, such as shown in FIGS. 10-13, the sacrificial core contact surface 270 forms a bore 276. As shown in FIG. 15, the core pin 340 may include geometry on the core pin corresponding to the contact surface 270 such that the core pin may be inserted into the bore 276 releasably engaging the sacrificial core contact surface 270 against the mating surface 348 of the core pin closing the second opening 268. The bore 276 may be cylindrical or tapered, and may have any cross-sectional shape as desired to form the overmolded waterway. The core pin 340 and mating surface 348 have a shape corresponding to the bore 276 and the desired shape for the inside of the overmolded waterway. In certain applications, not shown, the diameter of the bore 276 may be smaller than the inside diameter of the tube 220. Optionally, the diameter of the bore 276 may be smaller than the inside diameter of the throughway 272. In other applications, as shown for example in FIGS. 9 and 10, the outside diameter of the overmolded waterway 230 around the outlet portion 232 may be approximately the same as the outside diameter of the tube 220.

Optionally, the sacrificial core 260 may further include a protrusion 274 or other geometry positioned to inhibit overinsertion of the sacrificial core 260 into the waterway tube such as shown in FIG. 15. The protrusion 274 may be an embossment or other feature having an outside dimension larger than the inside dimension of the waterway tube. The protrusion 274 may be positioned such that by insertion of the core 260 into the tube 220 until a surface of the protrusion 174 is adjacent the tube end, the second portion 266 is positioned as desired relative to the end of the tube.

Figure 14:
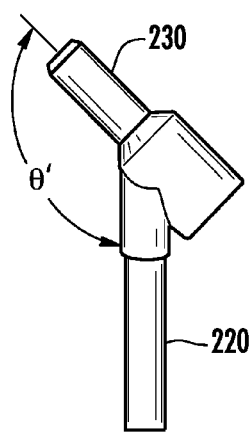
FIG. 14 is a side view of a male half of an overmolded waterway connection for an obtuse angle connection.

The overmolded waterway 230 may be formed by injection molding the waterway 230 onto the tube 220 and sacrificial core 260. In the overmolding process, the end portion of tube 220 with the sacrificial core 260, such as shown in FIG. 15, are positioned in a mold cavity (not shown) having a desired shape corresponding to the desired overmolded waterway. The core pin 340 is positioned in the mold cavity transverse to the tube end, geometry on the core pin 340 corresponding to the contact surface 270 being inserted into the bore 276 closing the second opening 268. The core pin 340 corresponds to the desired geometry of the inside dimensions of the overmolded waterway 230. As shown in FIGS. 9 and 14, the overmolded waterway 230 and corresponding core pin 340 may have a circular cross-section. However, the overmolded waterway 230 need not be circular, but rather can have non-circular shapes and combinations thereof, such as oval, D-shaped, rectangular, square, or any other cross-sectional shape as desired.

Figure 16:
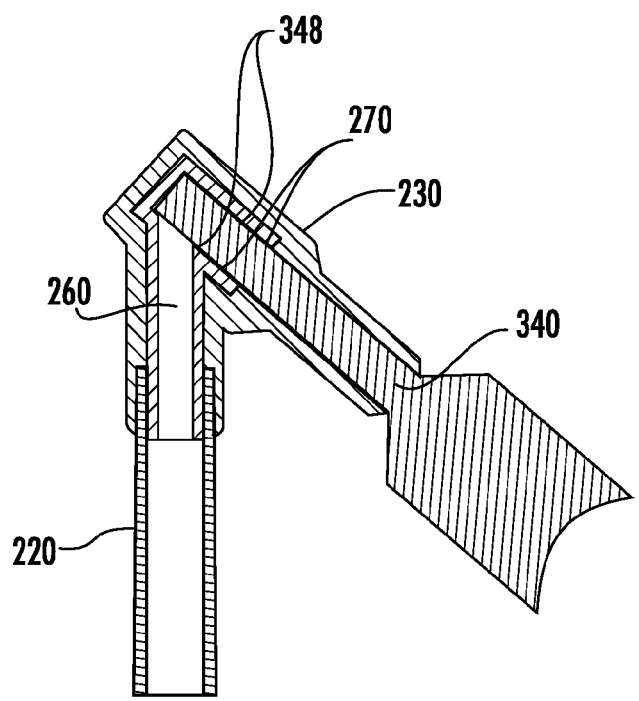
FIG. 16 is a cross-sectional view of the overmolded waterway connection of FIG. 9 showing the mold core pin in the sacrificial core following overmolding.

In the example of FIG. 15, prior to overmolding, the tube end and core pin 340 are positioned in the injection mold cavity such that a portion of the core pin 340 is positioned into the bore 276 to close the second opening 268. In the overmolding process, a polymeric material is injected into the mold cavity over a portion of the tube end and core pin forming the overmolded waterway 230 as shown in FIGS. 15 and 16, an interface of the sacrificial core contact surface 270 and the mating surface 348 of the core pin inhibiting ingress of molten polymer into the second opening 268. The overmolded waterway has the outlet portion 232 in fluid communication with the second opening 268 and the inside of the tube 220. Typically, the step of injection overmolding forms a bond between an exterior surface of the tube and an interior surface of the overmolded waterway. After molding the waterway 230, the core pin 340 is removed from the second opening 268 through the outlet portion 232.

Figure 12:
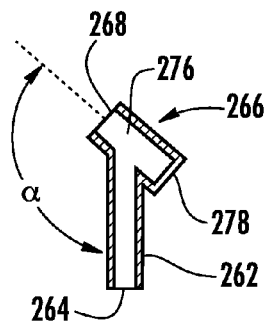
FIG. 12 is a cross-sectional view through a sacrificial core for an obtuse angle overmolded waterway.
Figure 13:
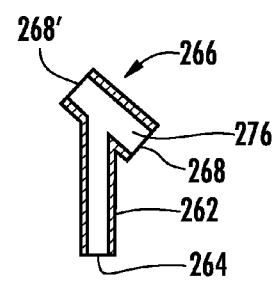
FIG. 13 is a cross-sectional view through a sacrificial core for an acute angle or obtuse angle overmolded waterway.

In the alternative such as shown in FIGS. 9-10, the overmolded waterway 230 is an angled waterway such that the angle θ may be between about 15° and 90°. Alternatively, the angle θ may be between about 30° and 70°. In yet another alternative such as shown in FIG. 14, the angle θ may be between about 90° and 175°, and alternatively may be between about 120° and 160°. For an angled waterway connection, the sacrificial core second portion 266 is angled to facilitate engagement with the core pin 340 such as shown in FIGS. 11-13. Typically, the angle between the second opening 268 and the shaft portion, shown as angle α in FIG. 12, is approximately the same as angle θ. It is contemplated that for certain applications it may be desired that angle α be greater than or less than angle θ.

As shown in FIGS. 11 and 12, the sacrificial core 260 may include a wall 278 at the end of the bore 276 at least partially closing the end of the bore. We have found in certain applications that the addition of the wall 278 improved the strength of the resulting overmolded waterway component. Alternatively, the wall 278 may be omitted as shown in FIG. 13 enabling the core pin to enter the bore 276 from either end of the bore, through the second opening 268 or an alternate second opening 268', for forming either an acute angle or obtuse angle waterway as desired.

Injection overmolding of thermoplastics is a process by which plastic is melted and injected into a mold cavity void, defined in this instance as the void volume between the mold core body and the mold cavity. Once the melted plastic is in the mold, it cools to a shape that reflects the form of the cavity. The resulting part is a finished part needing no other work before assembly into or use as a finished part. The injection molding machine has two basic components: an injection unit to melt and transfer the plastic into the mold, and a clamp to hold the mold shut against injection pressures and for parts removal. The injection unit melts the plastic before it is injected into the mold, then injects the melt with controlled pressure and rate into the mold. When the mold closes, the prefill valve shifts to close the opening to the reservoir. The area behind the main ram is then pressurized. After the injection cycle, the prefill valve opens to allow the clamp to gently open the mold halves.

Important factors in the processing of plastic include temperature, consistency, color dispersion and density of the melt. Conductive heat supplied by barrel temperature and mechanical heat generated by screw rotation both contribute to the processing of good quality melt. Often, most of the energy available for melting the plastic is supplied by screw rotation. Mixing happens between screw flights and the screw rotates, smearing the melted surface from the plastic pellet.

This mixing/shearing action is repeated as the material moves along the screw until the plastic is completely melted.

If the polymer is a thermoset, injection overmolding typically uses a screw or a plunger to feed the polymer through a heated barrel to decrease its viscosity, followed by injection into a heated mold. Once the material fills the mold, it is held under pressure while chemical crosslinking occurs to solidify the polymer. The cured part is then ejected from the mold while at the elevated temperature and cannot be reformed or remelted.

When thermoplastics are heated in an injection press, the polymers soften and as pressure is applied, flow as a fluid from the nozzle of the press into an injection mold. The mold has cavities that, when filled with the thermoplastic material, define the molded part. The material enters these cavities through passages cut into the mold, called runners. The mold also has passages in it to circulate a coolant, usually water, through strategic areas to chill the hot plastic. As it cools, the thermoplastic material solidifies. When cooled enough, the mold opens and the part is removed.

While the precise composition of the plastic polymers in the waterway tube and overmolded waterway of the present disclosure are not required to be of any specified polymer, in general, there are several guidelines which are applicable in the practice of this invention. It is of course, recognized that the precise operating conditions utilized in the overmolding process are well-known in the art and is specific to each injection molded polymer. It is well within the skill of the art to determine the applicable conditions which will result in the appropriate overmolded waterway. The degree of flexibility of the tube is not of particular relevance for this invention. The overmolded waterway can be a thermoplastic or a thermoset. At least one aspect of the invention is that it is desired for waterway applications that the polymer materials used be capable of forming a leak-proof bond, either chemical or physical, between the tube and the overmolded waterway.

In the practice of this invention, illustrative and non-limiting examples of the polymers which may be used in various combinations to form the plastic waterway tube as well as polymers which may be used in the overmolding process would include: polyacetals, typically highly crystalline linear thermoplastic polymers of oxymethylene units; poly(meth) acrylics, typically belonging to two families of esters, acrylates and methacrylates; polyarylether ketones containing ether and ketone groups combined with phenyl rings in different sequences and polyether ketones; polyacrylonitrile resins wherein the principal monomer is acrylonitrile; nylons or polyamides, including various types of nylon-6, nylon-6/6, nylon-6/9, nylon-6/10, nylon-6/12, nylon-11, nylon-12; polyamide-imides formed by the condensation of trimellitic anhydride and various aromatic diamines; polyacrylates of aromatic polyesters derived from aromatic dicarboxylic acids and diphenols; polybutene resins based on poly(1-butene); polycarbonates, typically based on bisphenol A reacted with carbonyl chloride; polyalkylene terephthalates typically formed in a transesterification reaction between a diol and dimethyl terephthalate; polyetherimides, based on repeating aromatic imide and ether units; polyethylene homopolymers and copolymers, including all molecular weight and density ranges and degrees of crosslinking; polypropylene homopolymers and copolymers; ethylene acid copolymers from the copolymerization of ethylene with acrylic or methacrylic acid or their corresponding acrylate resins; ethylene-vinyl acetate copolymers from the copolymerization of ethylene and vinyl acetate; ethylene-vinyl alcohol copolymers; polyimides derived from aromatic diamines and aromatic dianhydrides; polyphenylene oxides including polystyrene miscible blends; polyphenylene sulfides; acrylonitrile butadiene styrene terpolymers; polystyrenes; styrene-acrylonitrile copolymers; styrene-butadiene copolymers thermoplastic block copolymers; styrene maleic anhydride copolymers; polyarylsulfones; polyethersulfones; polysulfones; thermoplastic elastomers covering a hardness range of from 30 Shore A to 75 Shore D, including styrenic block copolymers, polyolefin blends (TPOS), elastomeric alloys, thermoplastic polyurethanes (TPUS), thermoplastic copolyesters, and thermoplastic polyamides; polyvinyl chlorides and chlorinated polyvinyl chlorides; polyvinylidene chlorides; allyl thermosets of allyl esters based on monobasic and dibasic acids; bismaleimides based generally on the condensation reaction of a diamine with maleic anhydride; epoxy resins containing the epoxy or oxirane group, including those epoxy resins based on bisphenol A and epichlorohydrin as well as those based on the epoxidation of multifunctional structures derived from phenols and formaldehyde or aromatic amines and aminophenols; phenolic resins; unsaturated thermoset polyesters including those of the condensation product of an unsaturated dibasic acid (typically maleic anhydride) and a glycol, wherein the degree of unsaturation is varied by including a saturated dibasic acid; thermoset polyimides; polyurethanes containing a plurality of carbamate linkages; and urea and melamine formaldehyde resins (typically formed by the controlled reaction of formaldehyde with various compounds that contain the amino group).

In a preferred embodiment, the polymers for both the waterway tube 120, 220 and the overmolded waterway 130, 230 will be high density polyethylene which is subsequently crosslinked, preferably by the application of an electron beam, although other modes of crosslinking are envisioned to be within the scope of this invention.

The trend today is to shift from thermoplastic materials, e.g., polypropylene, polybutylene, etc., to combined thermoplastic/thermoset materials, e.g., crosslinked polyethylene wherein at least a portion of the polymer is crosslinked, for example approximately 65% thermoset/35% thermoplastic. However, this shift in materials is not simple in that there are several processing changes which must be incorporated in order to fabricate acceptable parts. Since thermosets in general, cannot be extruded like thermoplastics, differing processing conditions must be employed in different sequences in order to achieve similar functionality for the thermoset/ thermoplastic product. While thermoplastic material can chemically bond to itself, as the percentage of crosslinking increases, there is less thermoplastic remaining to form this chemical bond. Therefore, without being limited to any one theory of operation, it is believed that one of the keys is the recognition of the need to form overmolded components at the earliest time when they are the least crosslinked. When crosslinking using radiation, this is before any crosslinking occurs. With silane crosslinking, this is typically after extrusion, but before crosslinking is complete.

For certain applications it may be desired for the combination of the above polymers, for use in the tube and overmold, to satisfy at least two simultaneous conditions. First, it is desirable that the plastic tube not overly soften and begin melt flow to the point where it loses structural integrity during the overmold process; and second, to form an essentially leak-proof bond the overmolded polymer must be compatible with the polymer of the tube to form the interface with the plastic tube, preferably through either a chemical and/or physical bond between the underlying plastic and the overmolded plastic. One of the keys is the recognition that the plastic tube be capable of maintaining structural integrity during the overmolding conditions during which the overmolded polymer is in melt flow.

While using polymer compositions which have differing softening points is one way to achieve the above objective, there are alternatives, which would include the use of two compositions which have the same softening point, but which are of different thicknesses, thereby through the manipulation of the time, temperature and pressure conditions experienced during the molding operation, the tube would not experience melt flow, even though it had a similar softening point or range. It is also possible that through the incorporation of various additives in the polymeric compositions, e.g., glass fibers, heat stabilizers, anti-oxidants, plasticizers, etc., that the softening temperatures of the polymers may be controlled.

In a preferred embodiment of the invention, the composition of the overmolded polymer will be such that it will be capable of at least some melt fusion with the composition of the tube, thereby maximizing the leak-proof characteristics of the interface between the tube and overmolded waterway. There are several means by which this may be achieved. One of the simplest procedures is to insure that at least a component of the polymer composition of the tube and that of the overmolded waterway is the same. Alternatively, it would be possible to insure that at least a portion of the polymer composition of the tube and that of the overmolded waterway is sufficiently similar or compatible so as to permit the melt fusion or blending or alloying to occur at least in the interfacial region between the exterior of the tube and the interior region of the overmolded waterway. Another manner in which to state this would be to indicate that at least a portion of the polymer compositions of the tube and the overmolded waterway are miscible.

In yet another embodiment, composites of rubber/thermoplastic blends are useful in adhering to thermoplastic materials used in the tube. These blends are typically in the form of a thermoplastic matrix containing rubber nodules functionalized and vulcanized during the mixing with the thermoplastic. The composite article is then obtained by overmolding the vulcanized rubber/thermoplastic blend onto the thermoplastic tube. In this manner, the cohesion at the interface between these two materials is generally higher than the tensile strength of each of the two materials. The quantity of vulcanizable elastomer may be from 20 to 90% by weight of the vulcanizable elastomer block copolymer combination. This block copolymer comprises a polyether or amorphous polyester block as the flexible elastomeric block of the thermoplastic elastomer while polyamide, polyester or polyurethane semicrystalline blocks for the rigid elastomeric block of the thermoplastic elastomer. In this approach, it is believed, without being held to any one theory of operation or mechanism, that the leak-proof aspect of this linkage utilizes a phenomenon typically used in the formation of moisture-proof electrical connections, i.e., dynamic vulcanization shrink wrap. In this manner, the overmolded polymer is formed having internally latent stresses which upon the application of heat permit the relaxation of the stresses with resulting contraction of various polymeric strands within the composition during cooling.

In one specific embodiment of this invention which meets the above criteria, the tube will be polypropylene and the overmolded waterway is SANTOPRENE® thermoplastic elastomer by Advanced Elastomer Systems having a Shore A durometer of approximately 73. Due to the fact that the SANTOPRENE® polymer is an ethylene-propylene copolymer, the melt fusion of at least a portion of the polypropylene with at least the propylene portion of the SANTOPRENE® will be effected.

Figure 17:
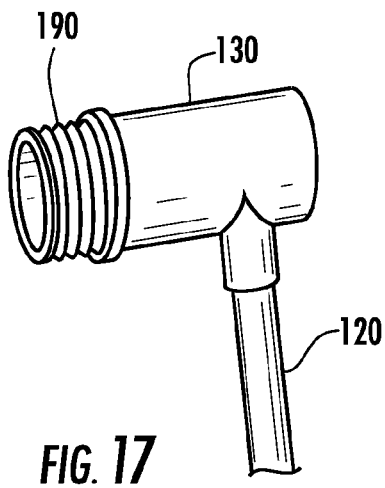
FIG. 17 is a perspective view of the overmolded waterway of FIG. 1 with a fitting.
Figure 18:
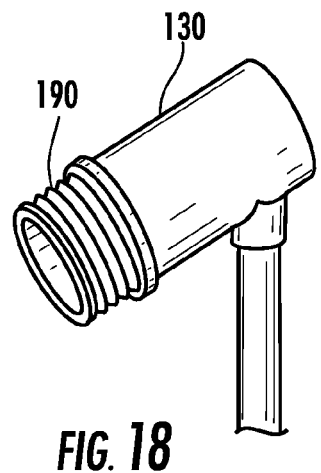
FIG. 18 is a perspective view of the overmolded waterway of FIG. 6A with a fitting.
Figure 19:
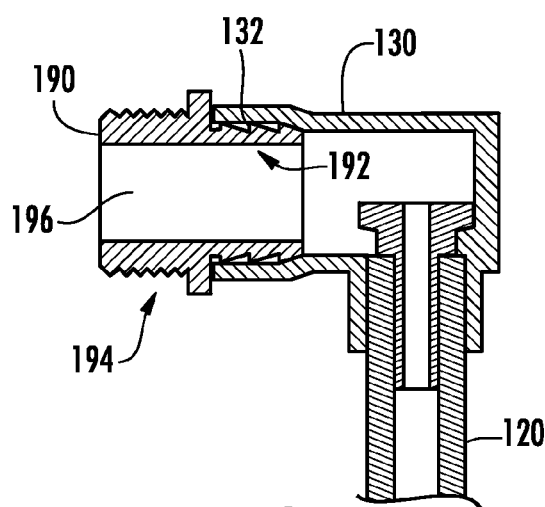
FIG. 19 is a cross-sectional view through the overmolded waterway and fitting of FIG. 17.
Figure 20A:
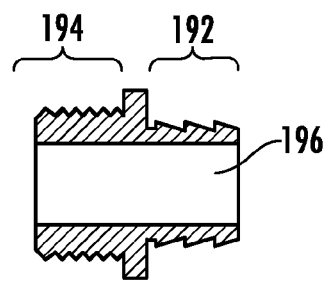
FIG. 20A is a cross-sectional view through the fitting of FIG. 19.
Figure 20B:
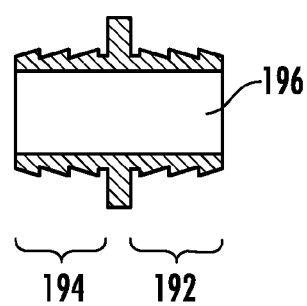
FIG. 20B is a cross-sectional view through an alternative fitting.

For certain applications, a fitting may be provided with the overmolded waterway. Referring now to FIGS. 17-19, a connector or fitting 190 may be provided with the overmolded waterway 130. As shown in FIG. 19, the fitting 190 may be positioned in the outlet portion 132 of the overmolded waterway 130 and retained by a friction fit. As illustrated in FIGS. 20A and 20B, the fitting 190 may include a first portion 192 and a second portion 194 and a bore 196 there through. In a typical application, the first fitting portion 192 has an outermost dimension equal to or larger than a corresponding cross-sectional inside dimension of the outlet portion 132 in which the first fitting portion will be positioned. In the alternatives shown in FIGS. 20A and 20B, the first fitting portion is a hose barb, the outermost dimension of the hose barb being larger than the corresponding cross-sectional inside dimension of the outlet portion 132. In one alternative, the first fitting portion 192 may include laterally-extending ribs to produce a deformation in the outlet portion 132. For certain applications the first fitting portion 192 may include other geometries, and may include little or no barbs or ribs if sufficient frictional force retaining the fitting is provided by the interface of the peripheral wall of the first fitting portion and the interior surfaces of the overmolded waterway. As shown in FIG. 19, the first fitting portion 192 may be configured to be inserted into the outlet portion 132 enlarging the outlet portion.

As shown in FIG. 20A, the second fitting portion 194 may be a threaded fitting. Alternatively, as shown in FIG. 20B, the second fitting portion may be a hose barb. While an externally threaded connector is shown in FIG. 20A for the second fitting portion 194, it is contemplated that the threads may be internally threaded or externally threaded. For some applications, the second fitting portion 194 may be different from the examples shown in FIGS. 19-20B, such as a push-to-connect fitting or a quick-connect fitting having a first connection portion that engages a second connection portion to form a connection, (e.g. a male-female connector) such as connection types known in the prior art.

In a preferred embodiment, the inside dimension of the outlet portion 132 is fixed to a smaller dimension than the outside dimension of the first fitting portion 192 by crosslinking the overmolded waterway 130 prior to insertion of the fitting 190. Crosslinking imparts a "memory" to the overmolded polymer's original shape and dimensions, and as such, upon deformation of a crosslinked shape, the deformed member will tend to resort back to the original dimension upon the application of a transforming force in a manner described below. Using this shape-memory feature permits leak-proof engagement between the peripheral walls of the first fitting portion 192 and the inner walls of the outlet portion 132. This is particularly preferable when the polymeric walls are polyethylene, which when crosslinked become crosslinked polyethylene or "PEX."

In one embodiment of this invention, the overmolded waterway 130 is made from high density polyethylene that is crosslinked (PEX). PEX contains crosslinked bonds in the polymer structure changing the thermoplastic into a thermoset. Crosslinking may be accomplished during or after the molding of the part. The required degree of crosslinking for crosslinked polyethylene tubing, according to ASTM Standard F 876-93 is between 65-89%. There are three classifications of PEX, referred to as PEX-A, PEX-B, and PEX-C. PEX-A is made by the peroxide (Engel) method. In the PEX-A method, peroxide blended with the polymer performs crosslinking above the crystal melting temperature. The polymer is typically kept at high temperature and pressure for long periods of time during the extrusion process. PEX-B is formed by the silane method, also referred to as the "moisture cure" method. In the PEX-B method, silane blended with the polymer induces crosslinking during molding and during secondary post-extrusion processes, producing crosslinks between a crosslinking agent. The process is accelerated with heat and moisture. The crosslinked bonds are formed through silanol condensation between two grafted vinyltrimethoxysilane units. PEX-C is produced by application of an electron beam using high energy electrons to split the carbon-hydrogen bonds and facilitate crosslinking.

Crosslinking imparts shape memory properties to polymers. Shape memory materials have the ability to return from a deformed state (e.g. temporary shape) to their original crosslinked shape (e.g. permanent shape), typically induced by an external stimulus or trigger, such as a temperature change. Alternatively or in addition to temperature, shape memory effects can be triggered by an electric field, magnetic field, light, or a change in pH, or even the passage of time. Shape memory polymers include thermoplastic and thermoset (covalently crosslinked) polymeric materials.

Shape memory materials are stimuli-responsive materials. They have the capability of changing their shape upon application of an external stimulus. A change in shape caused by a change in temperature is typically called a thermally induced shape memory effect. The procedure for using shape memory typically involves conventionally processing a polymer to receive its permanent shape, such as by molding the polymer in a desired shape and crosslinking the polymer defining its permanent crosslinked shape. Afterward, the polymer is deformed and the intended temporary shape is fixed. This process is often called programming. The programming process may consist of heating the sample, deforming, and cooling the sample, or drawing the sample at a low temperature. The permanent crosslinked shape is now stored while the sample shows the temporary shape. Heating the shape memory polymer above a transition temperature $T_{trans}$ induces the shape memory effect providing internal forces urging the crosslinked polymer toward its permanent or crosslinked shape. Alternatively or in addition to the application of an external stimulus, it is possible to apply an internal stimulus (e.g., the passage of time) to achieve a similar, if not identical result.

A chemically crosslinked network may be formed by low doses of irradiation. Polyethylene chains are oriented upon the application of mechanical stress above the melting temperature of polyethylene crystallites, which can be in the range between 60° C. and 134° C. Materials that are most often used for the production of shape memory linear polymers by ionizing radiation include high density polyethylene, low density polyethylene and copolymers of polyethylene and poly(vinyl acetate). After shaping, for example, by extrusion or compression molding, the polymer is covalently crosslinked by means of ionizing radiation, for example, by highly accelerated electrons. The energy and dose of the radiation are adjusted to the geometry of the sample to reach a sufficiently high degree of crosslinking, and hence sufficient fixation of the permanent shape.

Another example of chemical crosslinking includes heating poly(vinyl chloride) under a vacuum resulting in the elimination of hydrogen chloride in a thermal dehydrochlorination reaction. The material can be subsequently crosslinked in an HCl atmosphere. The polymer network obtained shows a shape memory effect. Yet another example is crosslinked poly[ethylene-co-(vinyl acetate)] produced by treating the radical initiator dicumyl peroxide with linear poly[ethylene-co-(vinyl acetate)] in a thermally induced crosslinking process. Materials with different degrees of crosslinking are obtained depending on the initiator concentration, the crosslinking temperature and the curing time. Covalently crosslinked copolymers made from stearyl acrylate, methacrylate, and N,N'-methylenebisacrylamide as a crosslinker.

Additionally shape memory polymers include polyurethanes, polyurethanes with ionic or mesogenic components, block copolymers consisting of polyethyleneterephthalate and polyethyleneoxide, block copolymers containing polystyrene and poly(1,4-butadiene), and an ABA triblock copolymer made from poly(2-methyl-2-oxazoline) and poly(tetrahydrofuran). Further examples include block copolymers made of polyethylene terephthalate and polyethylene oxide, block copolymers made of polystyrene and poly(1,4-butadiene) as well as ABA triblock copolymers made from poly(tetrahydrofuran) and poly(2-methyl-2-oxazoline). Other thermoplastic polymers which exhibit shape memory characteristics include polynorbornene, and polyethylene grated with nylon-6 that has been produced for example, in a reactive blending process of polyethylene with nylon-6 by adding maleic anhydride and dicumyl peroxide.

Referring now to FIG. 19, the first fitting portion 192 is positioned in the outlet portion 132 of the overmolded waterway 130. In this example, the overmolded waterway 130 may be made from a shape memory polymer such as crosslinked polyethylene. The first fitting portion may be pressed into the outlet portion. In one application, the overmolded fitting may be heated to an elevated temperature to increase the pliability of the polymer before inserting the first fitting portion. Alternatively, the first fitting portion may be pressed into the outlet after molding the overmolded waterway while the material is still warm from the molding process. In yet another application, the first fitting portion is inserted into the outlet portion while overmolded waterway is at an ambient temperature. In any event, after the fitting is positioned in the overmolded waterway, the heat may be applied to induce the shape memory polymer to induce the shape memory effect by exceeding transition temperature $T_{trans}$. As discussed above, the shape memory of crosslinking provides internal forces urging the enlarged crosslinked outer portion 132 toward its original dimensions after deformation of the same. When the first fitting portion 192 having an outer diameter larger than the original dimensions of the outer portion 132 is placed into the outlet portion, the shape memory property of the polymer cannot fully revert to its original dimensions, but draws at least partially toward its original dimension around the fitting. The shape memory of crosslinking enables the overmolded outer portion 132 to engage the peripheral circumferential walls of the fitting portion 192, and the outer portion may conform to at least a portion of the shape of the fitting portion 192. Using the shape-memory of the crosslinked polymer permits leak-proof engagement of the peripheral circumferential walls of the fitting portion 192 to form a leak-proof engagement with the inner walls of the outer portion 132. The crosslinked outer portion 132 may engage the peripheral circumferential walls of the fitting portion 192 with or without the application of heat. Alternatively or in addition to the application of temperature, an internal stimulus, such as the passage of time, may be sufficient for the shape memory effect to form a leak-proof engagement between the peripheral walls of the first fitting portion 192 and the inner walls of the outlet portion 132.

As used in this application, crosslinking percentages which range from 20-98% are applicable, with a more preferred range being 40-90%, and most preferred from 65-89%.

As used in this application, the requisite degree of expansion of the inside dimension of the overmolded waterway 130 by the inserted fitting 192 is between about 5% and 100% inclusive, the degree of expansion dependent upon various factors, including the wall thickness of the overmolded waterway 130, where the thicker the wall, the less expansion typically employed. The inside dimension expansion is also related to wall thickness, and this percentage can range from at least approximately 20% to 150% inclusive, this percentage increases as wall thickness decreases. In a more preferred embodiment, the requisite degree of inside dimension expansion of the overmolded waterway by the inserted fitting will be increased by an amount that corresponds to a radial height of a barb, which typically ranges approximately an additional 5%, more preferably 10%, most preferably 15% in addition to the expansion achieved by fitting insertion. Of course it is recognized that if the inserted fitting expands the inside dimension of the overmolded waterway by a sufficient degree, and the amount of insertion is sufficient to impart a surface area that creates lateral forces in excess of any internal pressure in the fitting such as water pressure, i.e., $F_{(lateral\ retaining\ force)} > F_{(water\ pressure)}$ then no barbs are necessary, although highly preferred. While house water pressure is the comparative useful for the disclosed application, in a more generic sense, the relationship must simply exist in comparison to the intended application.

While the fitting 190 cross-section is preferably circular as shown in FIGS. 17-20B, other profiles are envisioned to be within the scope of this invention.

While the invention has been illustrated and described in detail in the drawings and foregoing description, the same is to be considered as illustrative and not restrictive in character, it being understood that only preferred embodiments have been shown and described and that all changes and modifications that come within the spirit of the invention are desired to be protected by the appended claims and the equivalents thereof.

What is claimed is:

1. A process for providing an overmolded waterway comprising
   providing a longitudinal tube having a tube inside dimension at a proximate end,
   inserting a shaft portion of a sacrificial core into said end of the tube, the shaft portion having a first opening therein, the sacrificial core having a second tubular portion adjacent the end of the tube comprising a second opening, the second opening in fluid communication with the first opening and the inside of the tube,
   positioning at least the end of the tube with the sacrificial core into a mold cavity having a desired shape,
   positioning a core pin at least partially into the mold cavity with a portion of the core pin into the sacrificial core second opening closing the second opening,
   injection overmolding a waterway over a portion of the tube end and core pin in the mold cavity, the overmolded waterway having an outlet portion in fluid communication with the second opening and the inside of the tube, and
   removing the core pin from the second opening through the outlet portion and removing the overmolded waterway from the mold cavity.

2. The process of claim 1, where the outlet portion is oriented between about 15° and 175° from the longitudinal direction of the tube.

3. The process of claim 1, where the outlet portion is oriented about 90° from the longitudinal direction of the tube.

4. The process of claim 1, where the shaft portion of the sacrificial core has an outer dimension smaller than the tube inside dimension.

5. The process of claim 1, where the tube is elastic and the shaft portion of the sacrificial core has an outer dimension greater than the tube inside dimension.

6. The process of claim 1, further comprising
   crosslinking at least a portion of one or more components selected from a group consisting of the tube, the sacrificial core, the overmolded waterway, and a combination or two or more thereof by application of an electron beam.

7. The process of claim 6, where the overmolded waterway is crosslinked, and the process further comprises
   providing a fitting having a first fitting portion and a second fitting portion and a bore there through, the first fitting portion having an outermost dimension equal to or larger than a corresponding cross-sectional dimension of the outlet portion,
   inserting the first fitting portion into the outlet portion enlarging the outlet portion.

8. The process of claim 7, where the second fitting portion is selected from a group consisting of threaded fitting, hose barb, and quick connect fitting.

9. The process of claim 1, where the outlet portion is oriented between about 30° and 70° from the longitudinal direction of the tube.

10. The process of claim 1, where the outlet portion is oriented between about 120° and 160° from the longitudinal direction of the tube.

11. The process of claim 7, the first fitting portion having a barb with an outermost dimension larger than the corresponding cross-sectional dimension of the outlet portion.

* * * * *